Oct. 5, 1937.  J. D. LEAR ET AL  2,095,218
CONDENSATE COLLECTOR
Filed Sept. 7, 1935  2 Sheets-Sheet 2

Inventor
Joseph D. Lear
Joseph Askin
Albert R. Henry
Attorney

Patented Oct. 5, 1937

2,095,218

UNITED STATES PATENT OFFICE 2,095,218

CONDENSATE COLLECTOR

Joseph D. Lear and Joseph Askin, Buffalo, N. Y., assignors to Fedders Manufacturing Company, Inc., Buffalo, N. Y.

Application September 7, 1935, Serial No. 39,609

2 Claims. (Cl. 62—103)

This invention relates to a condensate collector which is adapted for use in cooperation with a cooling coil of a refrigeration system.

Heretofore it has been proposed to collect the condensed moisture in various types of drip pans, to protect the stored foods which are usually positioned beneath the coil in racks or shelves. These devices have been subject to several objections in that their extent and disposal militate against the proper convective circulation of the air to and from the coil; and furthermore, due to the proximity of the pan to the coil, they have been subject to low temperatures, and, accordingly, have themselves acted as condensers, with undesirable drainage effects.

In the present invention, these difficulties have been obviated by providing a collector formed as a pair of spaced pans which are each perforated or formed with louvers throughout their extent, and which are thus disposed to provide air circulation at spaced intervals through the extent of their structure. Drainage from the coil is received largely by the upper pan, which also is formed to protect the openings in the underlying pan, which receives a minor portion of the drainage and additionally protects the stored food from condensates dripping from the upper pan.

Structurally the device is susceptible to production in the numerous required sizes by relatively simple die equipment, as set forth in the accompanying specification and drawings, wherein.

Figure 1:
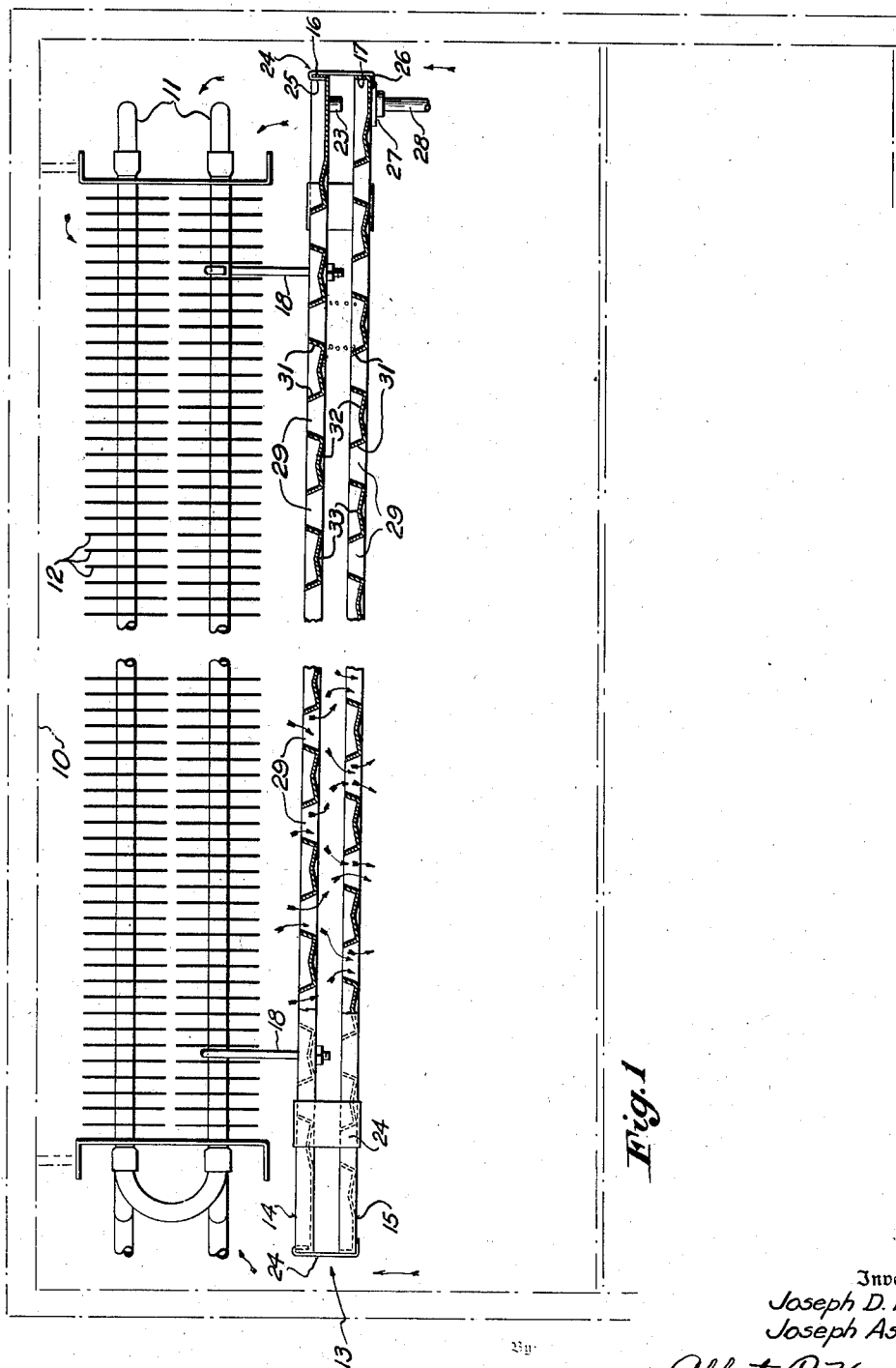
Fig. 1 is a diagrammatic longitudinal section through a refrigerating room, showing the collector positioned beneath the cooling coil, and shown partially in section.
Figure 2:
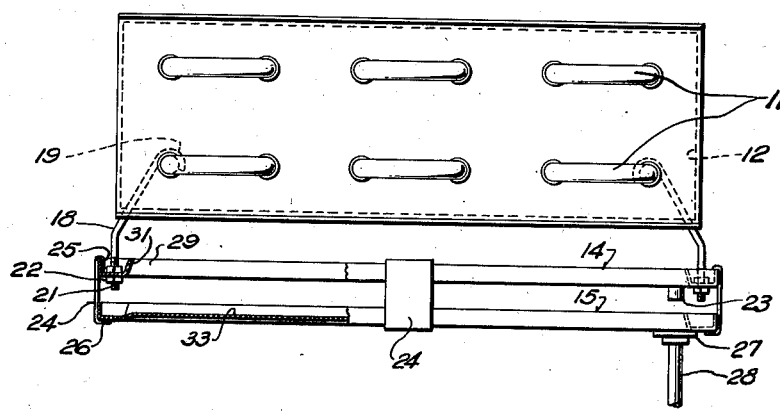
Fig. 2 is an end elevation of the cooling coil with the collector shown partially in section.
Figure 3:
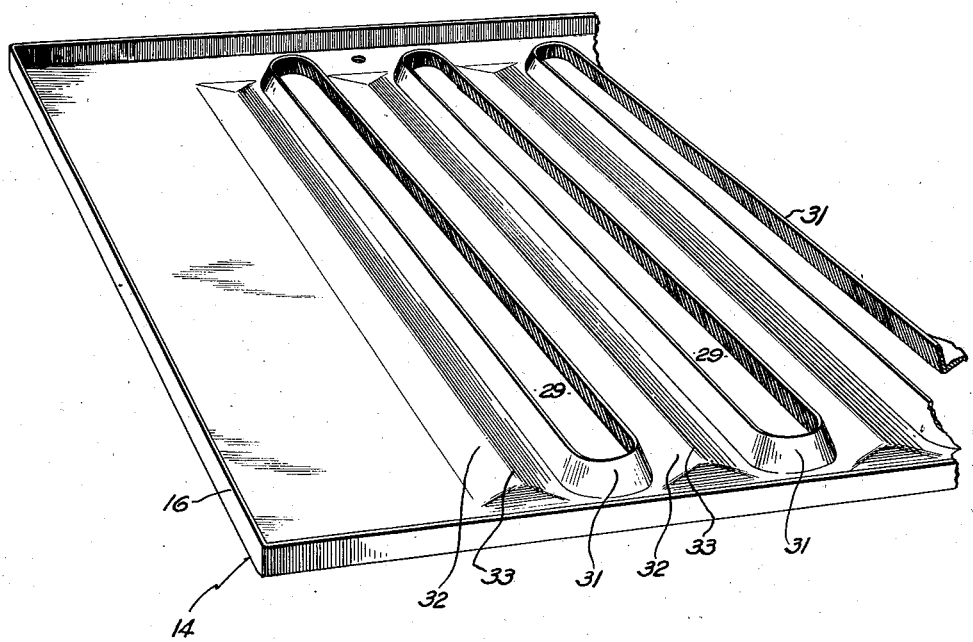
Fig. 3 is an enlarged perspective view of an end portion of the upper collector pan.

In Fig. 1 the numeral 10 indicates a refrigerating room or box. An evaporator is suitably suspended from the ceiling of the room, and it may be in the form of a horizontally disposed coil 11 having vertical fins 12.

The condensate collector 13 is formed of two rectangular pans 14 and 15 having peripheral flanges 16 and 17 respectively. The upper pan 14 is suspended directly under the evaporator by means of bolts 18 having hook portions 19 engaging the coil thereof, and threaded extremities 21 which project through the pan and receive nuts 22. The adjustment of the nuts 22 provides a simple means for varying the pitch of the structure to direct the water to a drain fitting 23 located in one corner of the pan.

The remaining pan 15 is retained in parallelism with the overlying pan 14 by means of connecting clips 24 which are formed with flanges 25 and 26, the former engaging about the flange of the pan 14, and the latter projecting under and supporting the pan 15. The pan 15 is provided with a drain fitting 27 located immediately under the fitting 23 and communicating with a drain pipe 28.

The upper pan 14 is formed with laterally disposed openings 29 which are each defined by a surrounding flange 31. This structure provides in effect a plurality of regularly spaced air funnels, the lip or crest portions thereof being elevated above the level of the pan. Between the funnels, the body of the pan is provided with raised portions 32 having a central ridge 33 from which the formation merges to the level of the pan. It is preferred that the width of the openings 29 be less than the distance between adjacent openings, for reasons which will be hereinafter apparent.

The lower pan 15 is preferably supplied with formations identical with those of the pan 14 and disposed thereon so that the center line of the funnels of one pan coincide with the ridges of the remaining pan. As shown in Fig. 1, this structure readily permits the circulation of air through the funnels of the pans to and from all portions of the evaporator. Water dripping from the fins, however, is effectively trapped, as it either drops directly into the upper pan 14 or through the funnel openings thereof onto the raised portions 32 of the underlying pan. It will be observed that condensates forming on the lower surface of the pan 14 are prevented from dropping through the funnels of the pan 15 by the ridge formations 32, which, through their angularity, direct the water to the mouths of the funnels, whence they drop onto the imperforate portion of the pan 15.

The slight pitch of the pans, as obtained by the adjusting means heretofore described, permits the water to drain to the common drain pipe 28, which leads to the exterior of the room. It will be apparent that various structural modifications may be made, such as in the shape of the funnels and disposal and number of pans, without departing from the inventive concept.

We claim:

1. A condensate collector adapted to be suspended beneath a refrigeration evaporator comprising a pair of pans each having a continuous upstanding marginal flange, means connecting the pans in superimposed spaced relation, each pan being formed with spaced openings defined by surrounding flange portions, the openings of one pan overlying imperforate portions of the remaining pan.

2. A condensate collector adapted to be suspended beneath a refrigeration evaporator comprising a pair of rectangular pans each having a continuous upstanding marginal flange, means connecting the pans in superimposed spaced relation, each pan being formed with elongated laterally disposed spaced openings defined by surrounding flange portions, the openings of one pan overlying imperforate portions of the remaining pan, and raised formations between adjoining flange portions.

JOSEPH D. LEAR.
JOSEPH ASKIN.